T. H. CHRISTY & S. K. HUNGER.
ADJUSTABLE CHAIN TIGHTENER.
APPLICATION FILED MAY 18, 1917.

1,243,711. Patented Oct. 23, 1917.

T. H. Christy and
S. K. Hunger, Inventors

Witness

UNITED STATES PATENT OFFICE.

THOMPSON H. CHRISTY AND SAMUEL K. HUNGER, OF VANDERGRIFT, PENNSYLVANIA.

ADJUSTABLE CHAIN-TIGHTENER.

1,243,711.      Specification of Letters Patent.      Patented Oct. 23, 1917.

Application filed May 18, 1917. Serial No. 169,583.

*To all whom it may concern:*

Be it known that we, THOMPSON H. CHRISTY and SAMUEL K. HUNGER, citizens of the United States, residing at Vandergrift, in the county of Westmoreland, State of Pennsylvania, have invented a new and useful Adjustable Chain - Tightener, of which the following is a specification.

It is the object of this invention to provide a novel means, mounted on the hub of a vehicle wheel, for tightening up an antiskid chain or like member which is carried by the tire of the wheel.

In the drawings:—

Figure 1:
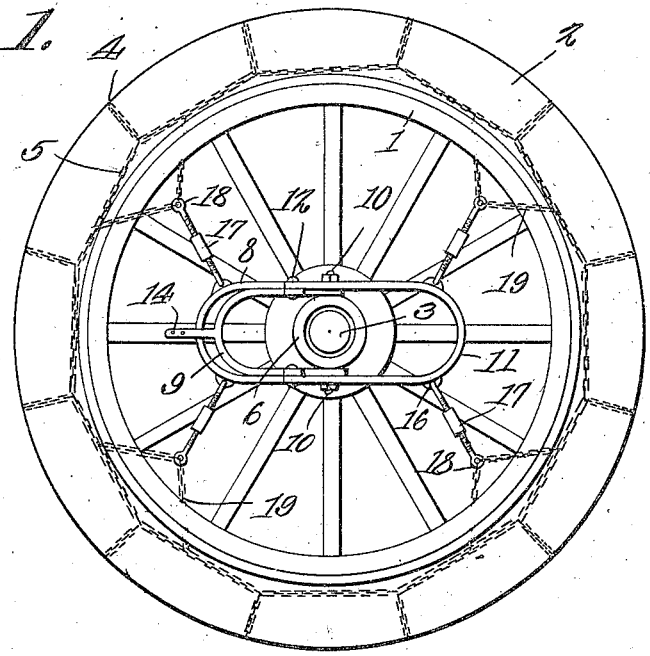
Figure 1 is a side elevation of a wheel upon which the structure forming the subject matter of this application has been mounted.

In Fig. 1 there appears a vehicle wheel including a rim 1 carrying a tire 2. The numeral 3 denotes the hub of the wheel. An anti-skidding device 4 is mounted on the tire 2 and includes circumferential side chains 5.

Figure 2:
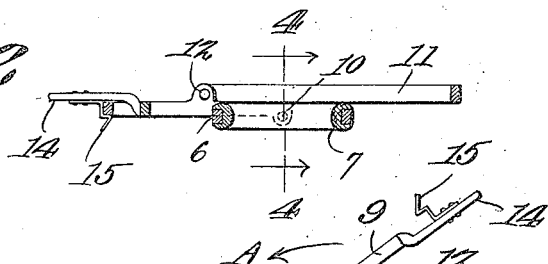
Fig. 2 is a longitudinal section of the tightener.
Figure 3:
Fig. 3 is a side elevation of the tightener, the same being in open position.
Figure 4:
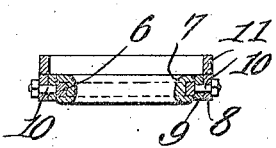
Fig. 4 is a section on the line 4—4 of Fig. 2.

The tightener forming the subject matter of this application includes a hub engaging support 6 preferably in the form of a ring which is padded as shown at 7, to the end that the hub 3 may not be marred. The tightener includes a U-shaped main link 8 and a U-shaped lever 9, these parts being united by means of pivot elements 10 with opposed portions of the ring 6. A U-shaped auxiliary link 11 is shown, and the same is pivoted at 12 to the sides of the lever 9, intermediate the ends of the lever. The crown of the lever 9 carries a projecting handle 14 provided with a resilient latch 15. Near to their outer ends, and at their sides, the links 8 and 11 are provided with eyes 16 to which are pivoted the inner ends of turnbuckles 17, having eyes 18 at their outer ends. Threaded through the eyes 18 are flexible elements 19, which may be chains, the outer ends of the flexible elements being detachably assembled, at spaced points, with the circumferential side chains 5 of the antiskidding device 4. In practical operation, the turnbuckles 17 are manipulated to adjust the flexible elements 19 approximately, and then the lever 9, being in the position of Fig. 3, is swung over in the direction of the arrow A until the lever 9 lies within the main link 8, as shown in Fig. 2, the latch 15 engaging automatically with the crown of the main link 8. By the operation above described, the link 11 will be drawn to the left (Fig. 3), thereby exerting a pull on the side chains 5. The ring 6 preferably fits somewhat loosely about the hub 3, so that when the lever 9 is swung over in the direction of the arrow A, the link 8 may also exert a tightening action on the side chains 5, on either the inside or the outside of the rim, or both.

Having thus described the invention, what is claimed is:—

1. In a device of the class described, a hub engaging ring; a U-shaped lever fulcrumed on the ring; a U-shaped link pivoted at one end to the intermediate portion of the lever; means assembled with the other end of the link for engaging a tire carried element, to tighten the same; and means for holding the lever against swinging movement when the lever is in tightening position.

2. In a device of the class described, a hub engaging support; a main link projecting in one direction from the support; a lever fulcrumed on the support; an auxiliary link projecting in an opposite direction and pivoted to the lever intermediate the ends of the lever; a latch mechanism forming a detachable connection between the outer end of the main link and the lever; and means assembled with the links for engaging an anti-skidding device.

3. In a device of the class described, a hub engaging support; a U shaped main link; a U-shaped lever; means for pivotally connecting the lever and the main link with the support; an auxiliary link pivoted to the lever intermediate the ends of the lever; a handle constituting a part of the lever; a latch carried by the handle and coacting with the crown of the main link; and means carried by the links for connecting the same with an anti-skidding device.

In testimony that we claim the foregoing as our own, we have hereto affixed our signatures in the presence of two witnesses.

THOMPSON H. CHRISTY.
SAMUEL K. HUNGER.

Witnesses:
FRANK D. NEAL,
CHAS. T. CULP.